US011928926B2

(12) United States Patent
Wyllie et al.

(10) Patent No.: US 11,928,926 B2
(45) **Date of Patent: *Mar. 12, 2024**

(54) ELECTRONIC GAMING SYSTEM AND METHOD FOR MANAGING FUNDS TRANSFER BASED UPON PROXIMITY OF A MOBILE DEVICE TO A GEOFENCED ZONE

(71) Applicant: Aristocrat Technologies Australia Pty Limited, North Ryde (AU)

(72) Inventors: Andrew Wyllie, North Ryde (AU); Alan Wong, West Pennant Hills (AU)

(73) Assignee: ARISTOCRAT TECHNOLOGIES AUSTRALIA PTY LIMITED, North Ryde (AU)

(*) Notice: Subject to any disclaimer, the term of this patent is extended or adjusted under 35 U.S.C. 154(b) by 0 days.

This patent is subject to a terminal disclaimer.

(21) Appl. No.: 18/160,842

(22) Filed: Jan. 27, 2023

(65) Prior Publication Data

US 2023/0177918 A1 Jun. 8, 2023

Related U.S. Application Data

(63) Continuation of application No. 17/491,020, filed on Sep. 30, 2021, now Pat. No. 11,580,819, which is a (Continued)

(30) Foreign Application Priority Data

Feb. 15, 2019 (AU) ................................ 2019900488
Sep. 18, 2019 (AU) ................................ 2019232826

(51) Int. Cl.
*G07F 17/32* (2006.01)

(52) U.S. Cl.
CPC ...... *G07F 17/3239* (2013.01); *G07F 17/3211* (2013.01); *G07F 17/3223* (2013.01); *G07F 17/3241* (2013.01)

(58) Field of Classification Search
CPC ............ G07F 17/3239; G07F 17/3211; G07F 17/3223; G07F 17/3241
See application file for complete search history.

(56) References Cited

U.S. PATENT DOCUMENTS 8,216,072 B2 7/2012 Curtis
8,622,836 B2 1/2014 Nelson
(Continued)

OTHER PUBLICATIONS

Office Action dated Mar. 16, 2021 for U.S. Appl. No. 16/787,917 (pp. 1-12).
(Continued)

*Primary Examiner* — Kevin Y Kim
(74) *Attorney, Agent, or Firm* — Armstrong Teasdale LLP

(57) ABSTRACT

A gaming system includes an electronic gaming machine (EGM) located within a defined zone of a gaming venue, a transmitter configured to output a first unique identifier, and a server including a processor and a memory storing instructions, where the instructions cause the processor to receive, in connection with a request at a mobile terminal to transfer funds to a gaming wallet accessible at the EGM, a communication from the mobile terminal including the first unique identifier, determine, based on the received first unique identifier, whether the mobile terminal is within the defined zone, and transmit, in response to determining whether the mobile terminal is within the defined zone, a signal to the mobile terminal indicating whether the mobile terminal is within the defined zone.

20 Claims, 6 Drawing Sheets

Related U.S. Application Data continuation of application No. 17/371,569, filed on Jul. 9, 2021, now Pat. No. 11,580,818, which is a continuation of application No. 16/787,917, filed on Feb. 11, 2020, now Pat. No. 11,074,779.

(56) References Cited

U.S. PATENT DOCUMENTS

| | | | |
|---|---|---|---|
| 9,306,952 | B2 | 4/2016 | Burman |
| 9,472,049 | B2 | 10/2016 | Allen |
| 9,666,021 | B2 | 5/2017 | Nguyen |
| 9,754,443 | B2 | 9/2017 | Hedrick |
| 9,805,547 | B2 | 10/2017 | Price |
| 10,121,312 | B2 | 11/2018 | Allen |
| 10,391,392 | B2 | 8/2019 | Nelson |
| 2003/0013532 | A1 | 1/2003 | Rowe |
| 2003/0022719 | A1 | 1/2003 | Donald |
| 2006/0211493 | A1 | 9/2006 | Walker |
| 2010/0106611 | A1 | 4/2010 | Paulsen |
| 2014/0200065 | A1 | 7/2014 | Anderson |
| 2015/0235521 | A1 | 8/2015 | Lutnick |
| 2016/0093166 | A1 | 3/2016 | Panambur |
| 2019/0043306 | A1 | 2/2019 | Higgins |

OTHER PUBLICATIONS

Notice of Allowance dated Jun. 16, 2021 for U.S. Appl. No. 16/787,917 (pp. 1-8).

Office Action (Non-Final Rejection) dated Jul. 19, 2021 for U.S. Appl. No. 16/774,088 (pp. 1-17).

Office Action (Notice of Allowance and Fees Due (PTOL-85)) dated Sep. 1, 2021 for U.S. Appl. No. 16/774,088 (pp. 1-9).

Office Action (Non-Final Rejection) dated Sep. 23, 2021 for U.S. Appl. No. 16/948,608 (pp. 1-13).

Office Action (Notice of Allowance and Fees Due (PTOL-85)) dated Nov. 9, 2021 for U.S. Appl. No. 16/774,088 (pp. 1-8).

Office Action (Notice of Allowance and Fees Due (PTOL-85)) dated Mar. 14, 2022 for U.S. Appl. No. 16/948,608 (pp. 1-12).

Office Action (Non-Final Rejection) dated Aug. 12, 2022 for U.S. Appl. No. 17/371,569 (pp. 1-5).

Office Action (Non-Final Rejection) dated Sep. 26, 2022 for U.S. Appl. No. 17/491,020 (pp. 1-6).

Office Action (Notice of Allowance and Fees Due (PTOL-85)) dated Nov. 4, 2022 for U.S. Appl. No. 17/491,020 (pp. 1-8).

Office Action (Notice of Allowance and Fees Due (PTOL-85)) dated Nov. 14, 2022 for U.S. Appl. No. 17/371,569 (pp. 1-8).

Office Action (Non-Final Rejection) dated Dec. 15, 2022 for U.S. Appl. No. 17/811,827 (pp. 1-10).

Office Action (Notice of Allowance and Fees Due (PTOL-85)) dated Mar. 6, 2023 for U.S. Appl. No. 17/811,827 (pp. 1-11).

Office Action (Non-Final Rejection) dated Jul. 11, 2023 for U.S. Appl. No. 17/543,345 (pp. 1-13).

Office Action (Non-Final Rejection) dated Aug. 21, 2023 for U.S. Appl. No. 18/160,854 (pp. 1-6).

Australian Examination Report No. 2 issued in App. No. AU2019232826, dated Oct. 2, 2023, 4 pages.

Office Action (Non-Final Rejection) dated Nov. 14, 2023 for U.S. Appl. No. 17/543,345 (pp. 1-5).

ELECTRONIC GAMING SYSTEM AND METHOD FOR MANAGING FUNDS TRANSFER BASED UPON PROXIMITY OF A MOBILE DEVICE TO A GEOFENCED ZONE

CROSS REFERENCE TO RELATED APPLICATIONS

This application is a continuation of U.S. patent application Ser. No. 17/491,020, filed Sep. 30, 2021, which is a continuation of U.S. patent application Ser. No. 17/371,569, filed Jul. 9, 2021, which is a continuation of U.S. patent application Ser. No. 16/787,917, filed Feb. 11, 2020, which claims priority to Australian Patent Application Serial No. 2019232826, filed Sep. 18, 2019, and Australian Provisional Patent Application Serial No. 2019900488, filed Feb. 15, 2019, all of which are incorporated by reference herein in their entirety.

FIELD

The present application relates to a gaming system with geofenced funds transfer.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

In larger venues, systems are provided that enable additional functionality to be provided alongside gaming machines. For example, player tracking systems enable a venue to track a player's play and provide additional rewards to players based on factors such as the amount the player wagers or how frequently they wager.

Player tracking systems enable a user to establish an account and transfer credits to the gaming machine and back to the player account. In some implementations a player marketing module is provided at the gaming machine, and after a player enters a player tracking card, the player marketing module communicates with the player tracking module, which communicates with the player tracking system to cause a download of the balance of the player the account to the player marketing module. The player marketing module then adds the downloaded account balance to the credit meter of the gaming machine. When the player removes the player tracking card at the end of a gaming session, the player marketing module removes the credits from the gaming machine and sends them to the player tracking system for storage as a currency value in the player account.

BRIEF DESCRIPTION

Embodiments of the disclosure prevent funds being transferred to a gaming wallet accessible at gaming devices of a venue when a mobile terminal running an application for making the funds transfer is within a defined zone.

An embodiment provides a mobile terminal including a processor and a memory storing an application comprising a wallet top-up function. The wallet top-up function includes functionality for transferring funds to a gaming wallet accessible at gaming devices of a venue. When the mobile terminal is running the application and the mobile terminal receives via the application a request to transfer funds to the gaming wallet, the mobile terminal conducts a check to determine that the mobile terminal is not in one or more defined zones of the gaming venue by sensing for beacon transmissions and determining whether any received beacon transmissions indicate that the funds transfer request should be inhibited, and denies the request upon determining that one or more received beacon transmissions indicate that the funds transfer request should be inhibited.

Another embodiment provides a method in a mobile terminal comprising running an application comprising a wallet top-up function on the mobile terminal, wherein the wallet top-up function includes functionality for transferring funds to a gaming wallet accessible at gaming devices of a venue. The method includes receiving via the application a request to transfer funds to the gaming wallet, conducting a check to determine that the mobile terminal is not in one or more defined zones of the gaming venue by sensing for beacon transmissions and determining whether any received beacon transmissions indicate that the funds transfer request should be inhibited, and denying the request upon determining that one or more beacon transmissions indicate that the funds transfer request should be inhibited.

Another embodiment provides gaming system comprising a plurality of Bluetooth beacons, at least some of which are located within one or more defined zones of a gaming venue, each beacon configured to output a beacon identifier, and a server storing data defining which of the Bluetooth beacons are within the one or more defined zones. The server is configured to receive, in connection with a request at a mobile terminal to transfer funds to a gaming wallet accessible at gaming devices of a venue, a communication from the mobile terminal including at least one beacon identifier, check based on the received at least one beacon identifier whether the mobile terminal is in one of the one or more defined zones, and send a response to the mobile terminal indicative of whether the mobile terminal should deny the funds transfer request.

BRIEF DESCRIPTION OF THE DISCLOSURE

DETAILED DESCRIPTION

Figure 1:
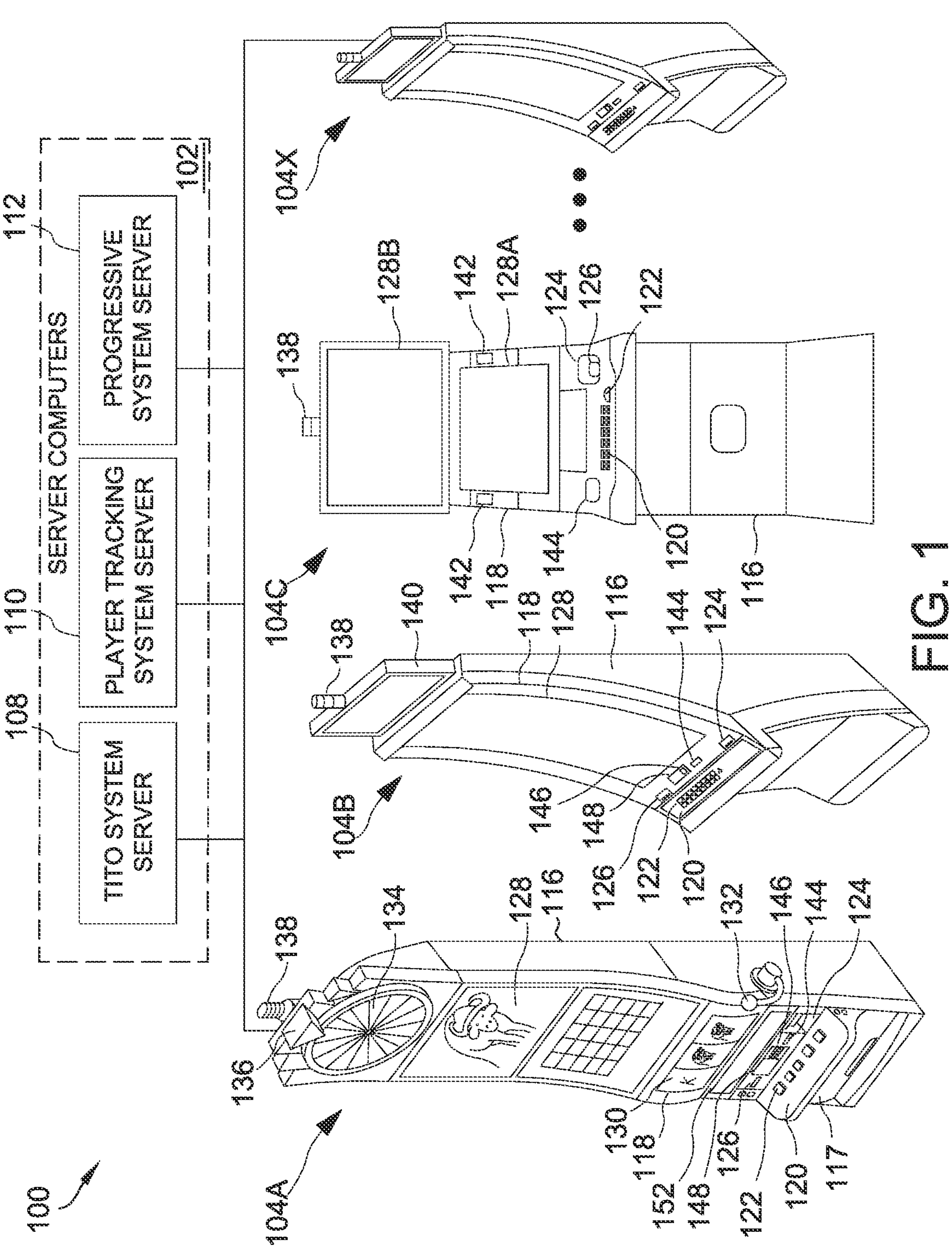
FIG. 1 is an exemplary diagram showing several EGMs networked with various gaming related servers.

FIG. 1 illustrates several different models of EGMs 104 which may be networked to various gaming related servers of a casino management system 102 to form a gaming system 100. Gaming devices 104A-104X can be slot machines, video poker machines, bingo machines, etc.

Communication between the gaming devices 104A-104X and the server computers 102 using one or more networking protocols, for example via an Ethernet or using a multi-drop floor protocol.

The casino management system 102 may include, a ticket-in-ticket-out (TITO) system server 108, a player tracking system server 110, and/or a progressive system server 112.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button zone or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display zone 118 comprising a number (typically 3 or 5) of mechanical reels 130 with various symbols displayed on them. The reels 130 are independently spun and stopped to show a set of symbols within the gaming display zone 118 which may be used to determine an outcome to the game. In embodiments where the reels are mechanical, mechanisms can be employed to implement greater functionality. For example, the boundaries of the gaming display zone boundaries of the gaming display zone 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display zone 118 may be raised by moving a corresponding mechanical shutter upwards to reveal an additional row of symbol positions on stopped mechanical reels. Further, a transparent or translucent display panel may be overlaid on the gaming display zone 118 and controlled to override or supplement what is displayed on one or more of the mechanical reel(s).

In many configurations, the gaming machine 104A may have a main display 128 (e.g., video display monitor) mounted to, or above, the gaming display zone 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

In an embodiment, corresponding functionality can be provided by a player marketing module 105 which also includes a transceiver for wireless communication with a player's smartphone, a keypad and/or an illuminated display 148 for reading, receiving, entering, and/or displaying player tracking information. The player marketing module communicates with both the player tracking system and the game controller within the related gaming devices. An advantage of a separate player marketing module 105 is that a venue that uses gaming machines from a number of manufacturers and/or older gaming machines can provide common player tracking interface across a fleet of gaming machines. In some examples, the player marketing module may be configured to place communications onto a bus of the EGM and/or intercept communications placed on the bus by the game controller.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
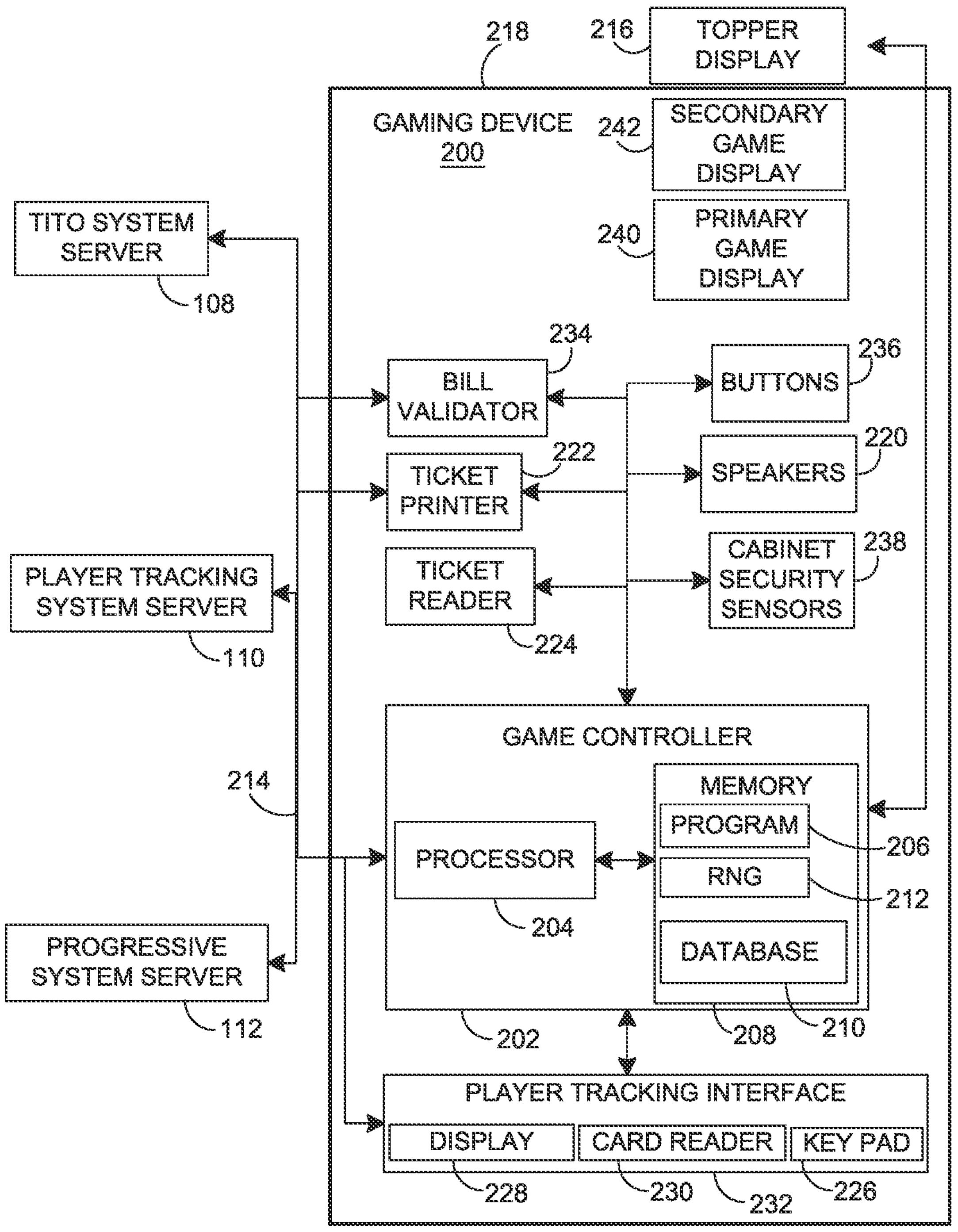
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server. The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Again, as described above, the player tracking interface could be replaced by a standalone player marketing module. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, a System 7000® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed. In an embodiment, inserting a loyalty card also enables the player to transfer funds from a central account stored within the player tracking system server 110 to an EGM 104. The gaming system 100 of the embodiments contains additional functionality described in further detail below that enables an alternative technique for transferring funds to an EGM without requiring a player to present a loyalty club card.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

In a ticket-in ticket-out system, when the player is done, he/she cashes out the credit balance (typically by pressing a cash out button to receive a ticket from the ticket printer 222). The ticket may be "cashed-in" for money or inserted into another machine to establish a credit balance for play.

Figure 3:
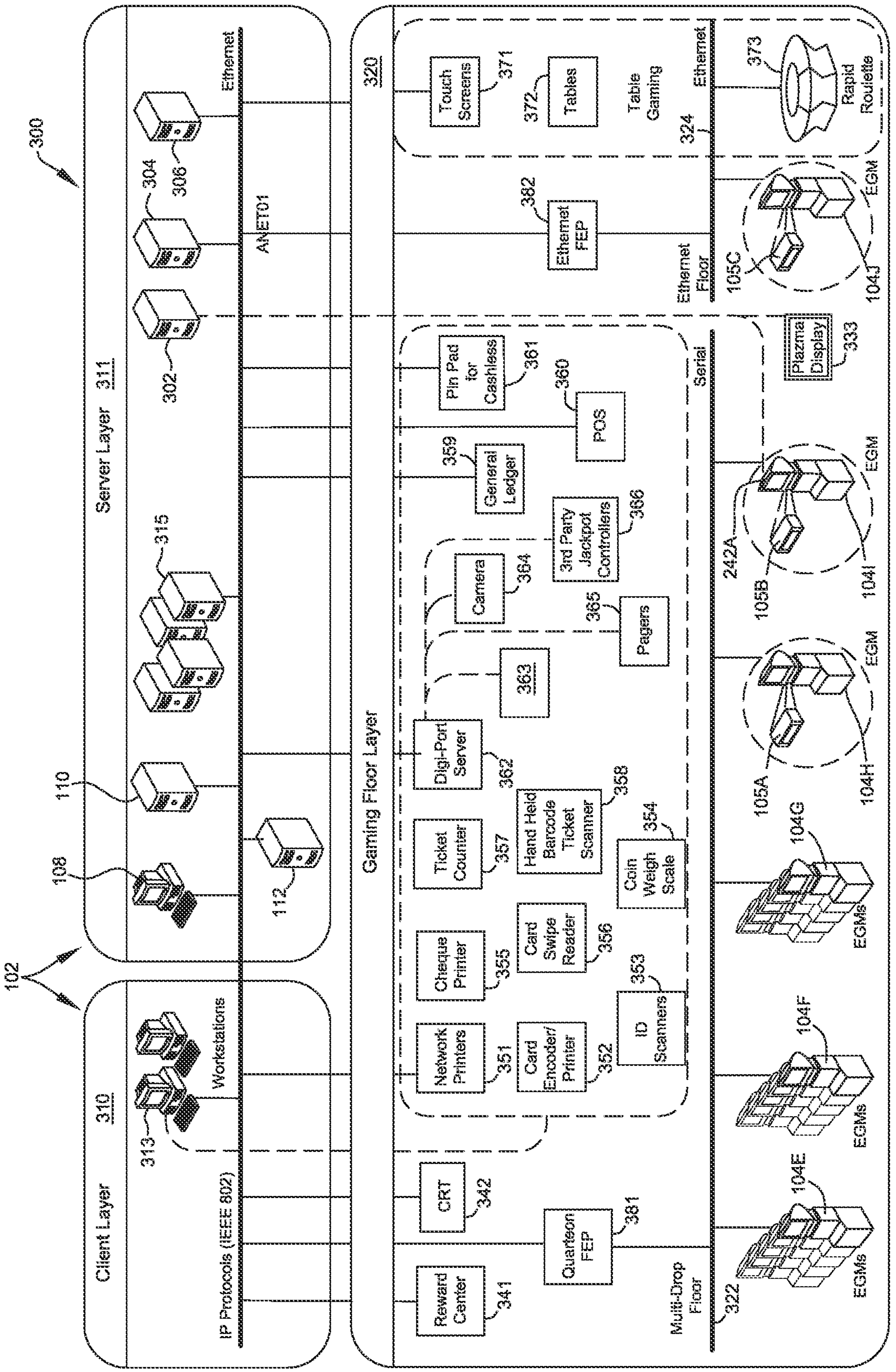
FIG. 3 is an exemplary diagram of a venue architecture.

FIG. 3 shows an example venue architecture 300. In FIG. 3 example functions provided by the server layer 311 of the casino management system 102 are shown as being provided by separate servers for illustrative purposes. In other embodiments, some functions may be provided by the same server (or the same group of servers where more than one server is needed to balance server load).

FIG. 3 illustrates that modern casino (or other venue) management systems need to be able to manage a wide-range of functionality. It will be appreciated that the functionality that is provided will, to some extent, depend on the complexity of the venue being managed. FIG. 3 includes only examples of the devices that may be interconnected within a venue.

The venue architecture has a client layer 310, a server layer 311 and a gaming floor layer 320. The client layer and the server layer are connected in a local zone network via Ethernet. Venue architecture 300 also includes connections to external networks, e.g., the Internet (not shown).

Client layer 310 consists of a number of workstations 313 for accessing services provide by the server layer 311. Different levels of access are provided to different workstations. For example, some work stations may only allow access to the player tracking system to enable employees to enroll new loyalty members or edit member details.

In the example, the server layer 311 provides a ticket-in-ticket-out (TITO) system server 108, a player tracking system server 110, a progressive system server 112, a graphics server 302, a reports web server 304 and a table game server 306. Other servers 315 are provided to carry out network functionality such as backing up data, providing redundancy.

Gaming layer 320 provides two separate networks 322, 324 for connecting EGMS 104 to the server layer 311. In other embodiments, there may be a single network. A first network is a multi-drop floor protocol network 322 that enables connections via serial ports of the EGMs. As shown in FIG. 3 each EGM 104E-104I within the multi-drop floor protocol network is connected via a front end processor 381, 382 to the server layer. There may be a number of front end processors 381 connected to subsets of the EGMs 104.

As shown in FIG. 3, player marketing modules 105A, 105B may be provided at each EGM 104.

The second network is an Ethernet based network 324. Other EGMs 104J, player marketing modules 105C, and automated table games such as an automated roulette table 373 are connected via this network. Again, one or more front end processor 382 connect the EGMS to the server layer 311.

In some embodiments, network connections may be different for EGMs 104 and the player tracking modules 105 provided at the respective EGMs 105. For example, a given EGM 104 may be connected to the multi-drop floor 322 while the player tracking module is connected to the Ethernet 324.

Gaming floor layer 320 also includes a reward centre kiosk 341 and a Cash Redemption Terminal (CRT) 342. Table clients 372 for use at gaming tables are also in the floor layer. The table clients communicate with table game server 306.

A wide variety of other components are provided within the gaming floor layer 320 including network printers 351, card encoder/printers 352, ID scanners 353, cheque printers 355, card swipe/readers 356, coin weigh scales 354, general ledger software 359, point of sale terminals 360 and pin pad terminals 361.

Third party components can be connected by a Digi-Port server 362 such as a ticket in a barrel machine 363, security cameras 364, pagers 365, and third party jackpot controllers 366.

A graphics server 302 drives one or more standalone displays 333 and/or may drive a top box display 242A of an EGM 104I.

In recent times, there has been a trend towards users of loyalty systems being able to present their loyalty cards using an electronic version of the loyalty card stored on their mobile terminal, for example, by scanning a virtual barcode at the time of making a transaction or by near field communication of the loyalty card data to a point of sale terminal. The inventors have realized that integrating mobile terminal based loyalty cards provides additional challenges within a casino management system 102 because of strict regulatory requirements. The inventors have also realized that mobile terminal based loyalty cards provide additional opportunities for enhanced functionality.

Figure 4:
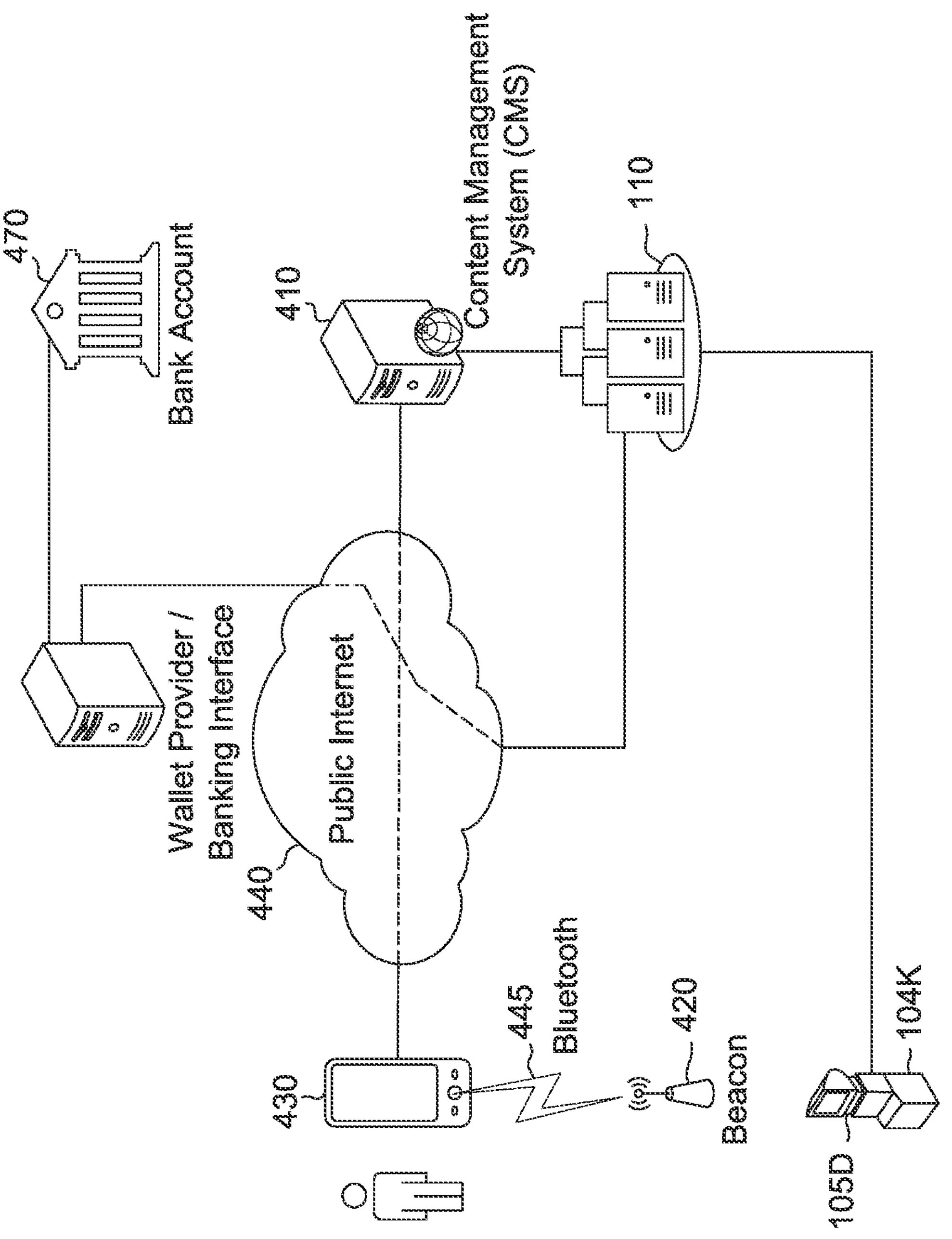
FIG. 4 is a block diagram of a funds transfer arrangement.

Referring to FIG. 4, there is shown a schematic diagram of an arrangement of an embodiment for enabling a funds transfer method (for example, as set out in FIG. 5) for a gaming system.

FIG. 4 illustrates a user mobile terminal 430 in the form of a Bluetooth enable smartphone. Other mobile terminals may be used, for example, tablets (such as an iPad) with cellular and Bluetooth communication capability or smart watches with cellular and Bluetooth communication capability. Further some venue configurations may permit the mobile terminal to communicate via a Wi-Fi network in which case cellular communication capability is unnecessary. In some configurations, communications may occur solely via a venue's Wi-Fi network to assist in identifying that a mobile terminal is in the venue.

In FIG. 4, a loyalty application has been downloaded to a mobile terminal. A user interacts with the loyalty application to complete registration details, for example to establish an account and register their membership of the player tracking system 110, for example, by entering an existing player tracking identifier, scanning a player loyalty card, or establishing a new account within the player tracking system.

As shown in FIG. 4, the mobile terminal 430 connects to the player tracking system 110 via a content management system 410 configured to control the information presented via the mobile application to the mobile terminal. This arrangement enables the same mobile application to be used across a number of different gaming venues with the presentation of content specific to the venue being controlled by the content management system 410.

As shown in FIG. 4, a Bluetooth beacon 420 is provided at each gaming device. Each Bluetooth beacon 420 has a unique identifier that it broadcasts 445 to nearby Bluetooth enabled devices. In an embodiment, the identifier of the Bluetooth beacon 420 is stored in the memory of the player tracking system 110 in association with an identifier identifying the gaming machine with which the beacon is associated. Some beacons incorporate functionality that enables the unique identifier to be changed in which case the identifier is updated each time it is changed. While shown as a separate component is FIG. 4 for illustrative purposes, beacon 420 is provided within player marketing module 105D in the embodiment and is under control of a processor of the player marketing module 105D. In other embodiments, the beacon could be incorporated within the EGM 104K.

In this embodiment, the loyalty application enables a user to connect over the internet 440 to a mobile wallet provider 460 which has a wallet-top-up function which allows a user to transfer funds from a user bank account 470 to a user account in the player tracking system 110 and between wallets of the user account. The wallets of a user account include at least a gaming wallet that the user can access at EGMs 104. While FIG. 4 shows integration with a player tracking system, other embodiments may employ another user account server to maintain the user account.

In embodiments of the disclosure, when the loyalty application is running on the mobile terminal, the wallet top-up functionality is enabled only when the mobile terminal is outside a defined zone, for example outside of a venue or inside a venue but outside of a gaming zone. An embodiment enables the application to be used for other functionality within the venue such as transferring funds to gaming devices without breaching regulatory conditions or player preferences. For example, some jurisdictions prevent users from withdrawing funds from bank accounts within a gaming zone of a venue accordingly, where the application is used to transfer funds to a gaming device in a gaming zone, functionality of the application for transferring funds to a gaming wallet is inhibited. In another example, a user may wish to prevent themselves from transferring funds when within a venue in order to preset a maximum amount that they can spend within a venue.

In an example, each user account on server 110 has at least a main wallet, a gaming wallet and a loyalty wallet. In an example, the main wallet is used for all non-gaming related transactions. In an example, the main wallet is the only account that a use to transfer funds to and from a bank account and in order to transfer funds to the gaming wallet, funds must first be transferred to the main wallet. In other examples, funds may be transferred to the gaming wallet directly or there is only a single wallet which is used for both gaming and non-gaming transactions (and is hence also a form of gaming wallet).

The gaming wallet is used for all gaming related transactions. The gaming wallet is the only wallet that is used to transfer funds to and from a gaming device. In one example, this functionality is only enabled inside the gaming zone. In an example, the account server also enables the setting of maximum daily limits for transfers from the main wallet to the gaming wallet.

The loyalty wallet stores all vouchers earned and redeemed by a patron's activity. The mobile terminal 430 is able to display all active vouchers and, for example, 12 months of history of vouchers redeemed.

Figure 6:
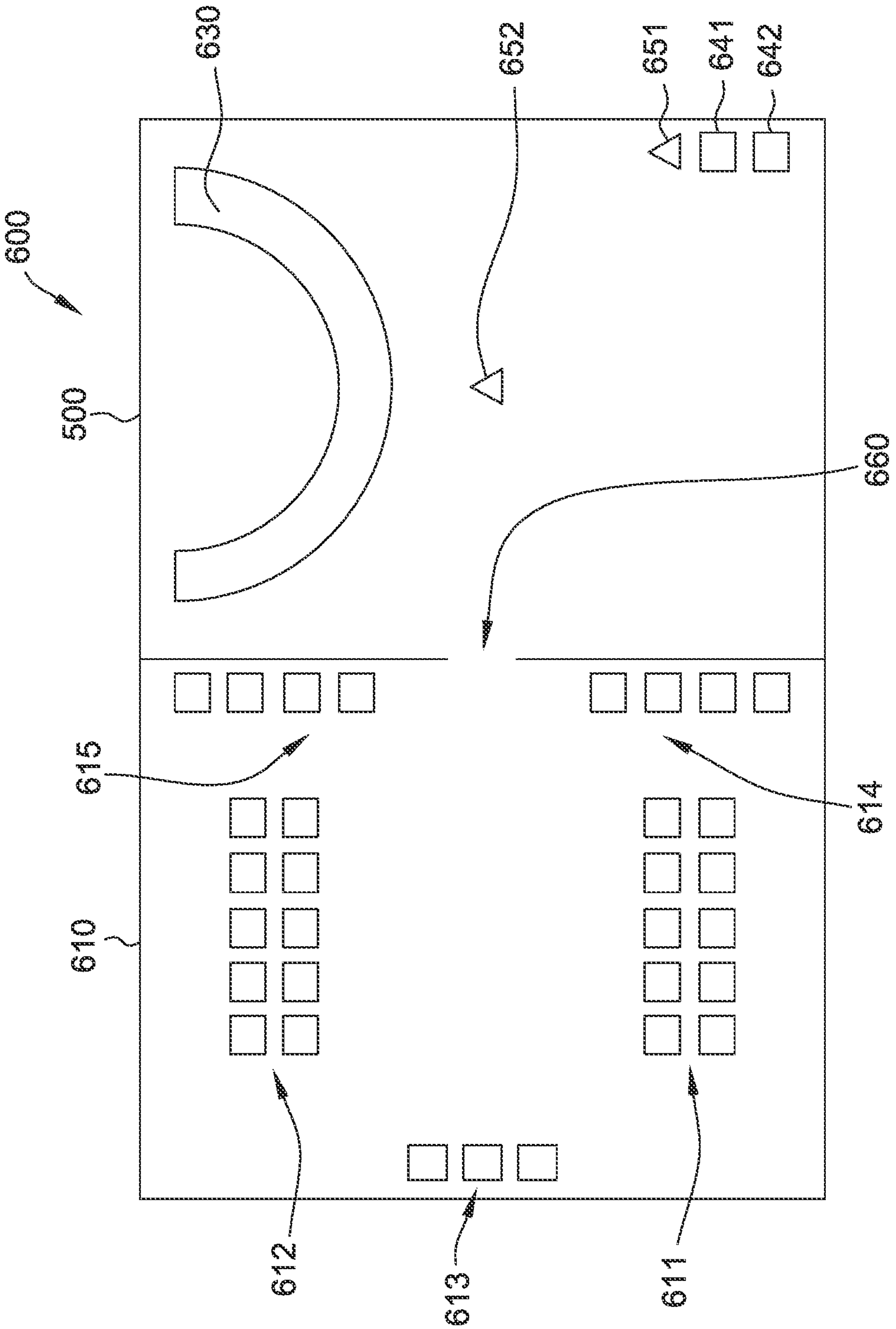
FIG. 6 is an example venue layout.

A schematic venue layout 600 is shown in FIG. 6. Venue layout 600 includes a gaming zone 610 comprising a plurality of banks of gaming devices 611-615. As indicated above, each gaming device has an associated beacon. Non-gaming zone 620 may include a bar 630 and automatic teller machines 641,642. As illustrated in FIG. 6, gaming zone 610 and non-gaming zone 620 may be connected by a doorway 660. In other examples, there may be no physical separation between gaming zone 610 and non-gaming zone 620.

Figure 5:
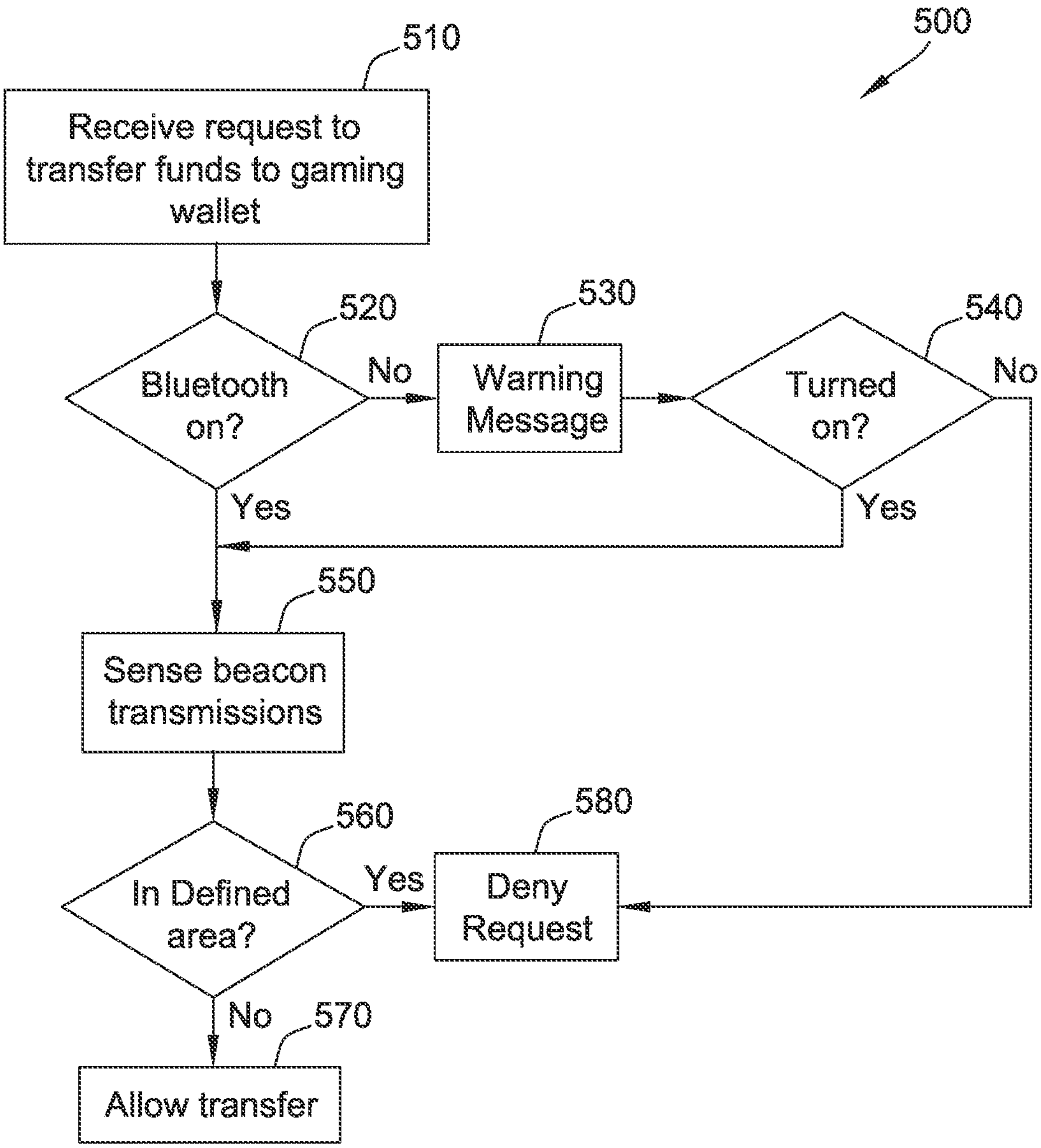
FIG. 5 is a flow chart of a fund transfer control method.

FIG. 5 is a flow chart 500 of a method of controlling funds transfer of an embodiment. At step 510, the loyalty application executing on the user's mobile terminal receives a request to transfer funds to a gaming wallet. For example, the application may present a funds transfer screen to a user that the user can interact with to specify an amount to transfer. At step 520, the application causes the mobile terminal 430 to determine whether Bluetooth is turned on. If it is turned off, the mobile terminal 430 displays 530 a warning message indicating that Bluetooth must be on for the transaction to proceed and, for example, presenting a "retry" button that a user can press once they have turned on Bluetooth (for example, by accessing the settings of their mobile terminal). At step 540, the mobile terminal 430 determines whether Bluetooth has been turned on and if not denies 580 the request for funds transfer. If Bluetooth has been turned on or was on in the first place, the method proceeds to step 550 in which the mobile terminal 430 senses for beacon transmissions. In one example, the mobile terminal extracts an identifier from each Bluetooth transmission that it receives.

At step 560, the mobile terminal determines whether it is in a defined zone, for example, the gaming zone. In one example, the mobile terminal does this by sending each identifier to server 110 which checks whether any of the identifiers corresponds to a gaming device within the gaming zone 610 and sends a response to the mobile terminal 430 that enables the terminal 430 to determine whether it is within the gaming zone 610. (In one example this is a "yes"/"no" response.) If the mobile terminal 430 determines it is within the gaming zone it denies 580 the funds transfer request. Otherwise, at step 560 the mobile terminal allows the funds transfer request.

In another example, the server 110 maintains a list of Bluetooth identifiers corresponding to defined zones and looks them up directly without determining whether they correspond to an EGM.

In other examples, funds transfers may be made when the mobile terminal 430 is able to sense an approved beacon, such a beacon 651 placed in proximity to automatic teller machines 641,642.

In other examples, a defined zone may extend beyond, for example, a gaming area in order to prevent a funds transfer from occurring within a defined distance of the gaming area. In such an example, one or more beacons, such as beacon 652 may be placed within venue so that they will be sensed when the mobile terminal is within the defined distance. In an example, the beacon 652 is a standalone beacon. In another example, the beacon may be associated with a non-gaming device within the venue. For example, reward centre kiosk 341.

In some examples, there may be more than one zone (e.g., plural gaming zones) where funds transfers to the gaming wallet are inhibited.

Accordingly, as described herein, a variety of specific technical improvements are achieved in specific manners by the present disclosure. For example, in at least some embodiments, at least one specific technical improvement is to the field of electronic gaming, and more particularly, to the technical field of geofenced based electronic gaming.

These technical improvements described herein allow players to use a mobile terminal and/or other features of the application to pay for a game located within a gaming zone without breaching regulatory requirements or player preferences. In particular, the embodiments described herein allow for a player to be prevented from transferring funds to a gaming wallet when they are in a gaming zone (e.g., a gaming floor of a casino). For example, some jurisdictions prevent users from withdrawing funds from bank accounts within a gaming zone of a venue. Moreover, some users may prefer to be prevented from transferring funds into a gaming wallet when they are located within a gaming zone. As a result, at least some embodiments of the disclosure allow players to use the mobile terminal to transfer funds from a gaming wallet to a gaming device in a gaming zone, while preventing the players from violating jurisdictional requirements and/or player preferences by transferring funds from another account and/or wallet to the gaming wallet when they are within the gaming zone.

These improvements are accomplished, as described in detail herein, by the use of at least one transmitter (e.g., a Bluetooth beacon) located in proximity to an EGM. For example, prior to initiation of funds transfer between different accounts (e.g., between a main wallet and a gaming wallet), an application on a mobile terminal may first be required to determine whether the mobile terminal is receiving a transmission from any transmitter within the gaming zone. If the mobile terminal determines that the mobile terminal is receiving a transmission from at least one transmitter within the gaming zone, the transfer of the funds may be prevented. Alternatively, if the mobile terminal determines that the mobile terminal is not receiving a transmission from at least one transmitter within the gaming zone, the transfer of funds may be allowed to proceed. This may ensure that a player's mobile device is not within a gaming zone prior to initiation of the funds transfer.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A gaming system comprising:
- a beacon located within a gaming venue and configured to transmit a first unique identifier to be received by a mobile device; and
- a server comprising a processor and a memory storing instructions and a plurality of unique identifiers, each unique identifier corresponding to a location zone of a plurality of location zones of the gaming venue, wherein the instructions, when executed by the processor, cause the processor to:
  - receive the first unique identifier from the mobile device;
  - compare the first unique identifier received from the mobile device to the plurality of unique identifiers stored in the memory; and
  - determine a location zone of the mobile device within the gaming venue based on the comparison.

2. The gaming system of claim 1, wherein the instructions, when executed by the processor, further cause the processor to:

determine, based on the comparison, that the first unique identifier received from the mobile device matches a first unique identifier stored in the memory; and determine a first location zone of the plurality of location zones stored in the memory that corresponds to the first unique identifier.

3. The gaming system of claim 1, wherein the instructions, when executed by the processor, further cause the processor to control a transfer of funds initiated at the mobile device.

4. The gaming system of claim 3, wherein the transfer of funds is a transfer of funds to a gaming wallet accessible at an electronic gaming machine (EGM) located within the gaming venue.

5. The gaming system of claim 4, wherein the EGM is a first EGM of a plurality of EGMs located within the gaming venue, the beacon being provided on the first EGM, and each location zone of the plurality of location zones corresponding to at least one EGM of the plurality of EGMs, and wherein the instructions, when executed by the processor, further cause the processor to determine that the mobile device is near the first EGM.

6. The gaming system of claim 5, wherein the first EGM comprises:

a display configured to display a wagering game;

a credit input mechanism including at least one of a card reader, a ticket reader, a bill validator, and a coin input mechanism; and a player tracking module, wherein the beacon is located within the player tracking module.

7. The gaming system of claim 1, wherein the instructions, when executed by the processor, further cause the processor to transmit a signal to the mobile device indicating whether a transfer of funds can be allowed, and wherein the mobile device controls the transfer of funds based on the received signal.

8. The gaming system of claim 1, wherein the beacon transmits the first unique identifier to the mobile device over a first wireless communication network, the server receiving the first unique identifier from the mobile device over a second, different wireless communications network.

9. The gaming system of claim 1, wherein a first subset of the plurality of location zones are associated with a defined gaming zone of the gaming venue, the defined gaming zone including a plurality of electronic gaming machines, and wherein the instructions, when executed by the processor, further cause the processor to determine whether the mobile device is within the defined gaming zone based on the determined location zone of the mobile device within the gaming venue.

10. The gaming system of claim 1, wherein the beacon is a short-range beacon configured for one-way transmission of the first unique identifier.

11. The gaming system of claim 1, wherein the beacon is configured to transmit the first unique identifier to the mobile device by a Bluetooth signal, and wherein the server receives the first unique identifier from the mobile device over a wireless internet network.

12. The gaming system of claim 1, wherein the beacon is configured to transmit the first unique identifier to the mobile device by a wireless internet signal.

13. The gaming system of claim 1, wherein the beacon is a first beacon of a plurality of beacons located within the gaming venue, each beacon of the plurality of beacons being configured to transmit a unique identifier capable of being received by the mobile device, wherein each unique identifier of the plurality of unique identifiers corresponds to at least one location zone of the plurality of location zones of the gaming venue.

14. A non-transitory computer-readable medium storing instructions that, when executed by a processor, cause the processor to:

receive a first unique identifier from a mobile device, the first unique identifier being initially transmitted from a beacon located within a gaming venue to the mobile device;

compare the first unique identifier received from the mobile device to a plurality of unique identifiers, each unique identifier corresponding to a location zone of a plurality of location zones of the gaming venue; and determine a location zone of the mobile device within the gaming venue based on the comparison.

15. The non-transitory computer-readable medium of claim 14, wherein the instructions, when executed by the processor, further cause the processor to:

determine, based on the comparison, that the first unique identifier received from the mobile device matches a first unique identifier of the plurality of unique identifiers; and determine a first location zone of the plurality of location zones that corresponds to the first unique identifier.

16. The non-transitory computer-readable medium of claim 14, wherein the instructions, when executed by the processor, further cause the processor to control a transfer of funds initiated at the mobile device.

17. A method of determining a location of a mobile device within a gaming venue, the method comprising:

receiving a first unique identifier at a mobile device from a beacon located within the gaming venue;

transmitting the first unique identifier from the mobile device to a server, the server including a processor and a memory, the memory storing instructions and a plurality of unique identifiers, each unique identifier corresponding to a location zone of a plurality of location zones of the gaming venue;

comparing, by the processor, the first unique identifier received from the mobile device to the plurality of unique identifiers stored in the memory; and determining a location zone of the mobile device within the gaming venue based on said comparing.

18. The method of claim 17 further comprising:

determining, based on said comparing, that the first unique identifier received from the mobile device matches a first unique identifier stored in the memory; and determining a first location zone of the plurality of location zones stored in the memory that corresponds to the first unique identifier.

19. The method of claim 17 further comprising controlling a transfer of funds initiated at the mobile device.

20. The method of claim 19, wherein the transfer of funds is a transfer of funds to a gaming wallet accessible at an electronic gaming machine (EGM) located within the gaming venue.

* * * * *